May 21, 1963 M. J. MATOVICH, JR 3,090,573

TAPE REEL DRIVE

Filed Nov. 9, 1961

INVENTOR.
MITCHEL J. MATOVICH, JR.
BY W. O. Quesenberry
D. E. Hodges
ATTYS.

United States Patent Office 3,090,573

Patented May 21, 1963

3,090,573

TAPE REEL DRIVE

Mitchel J. Matovich, Jr., Sunnyvale, Calif., assignor, by mesne assignments, to the United States of America as represented by the Secretary of the Navy Filed Nov. 9, 1961, Ser. No. 151,405

4 Claims. (Cl. 242—55.12)

Figure 1:
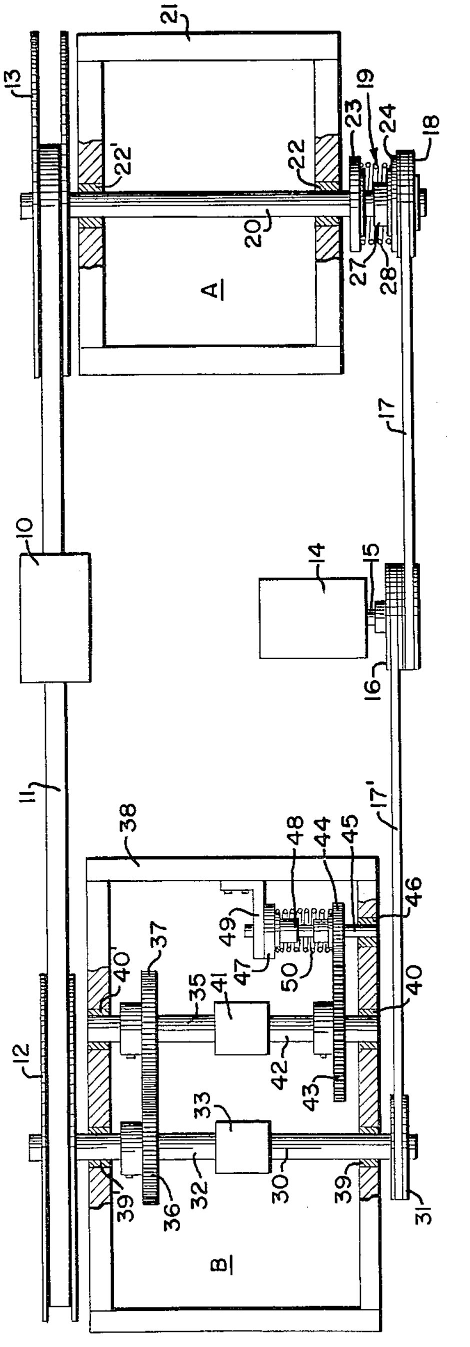

The subject invention generally relates to the art of reeling and winding and more particularly to a device for maintaining constant tension on a tape, as for example, a magnetic or punched tape, regardless of whether the tape is being run in its forward or reverse direction as well as when the tape is stopped.

Those concerned with the development of data processing and data storage devices have long recognized the need for a system of maintaining constant tension on data tapes throughout the use of the tape. That is, maintaining constant tension on the tape when it is being driven by the capstan unit and also when it is being rewound as well as when the tape is momentarily stopped. Although numerous prior systems have been developed for performing this function, such systems have proven to be either excessively complex or not capable of maintaning the tension within the desired limits.

In brief, the subject invention has been found to achieve constant tension on the tape within exceptionally close limits by utilizing an extremely simple system comprising a single motor, two drive pulleys, four gears, two one-way clutches and two slip clutches.

Figure 2:
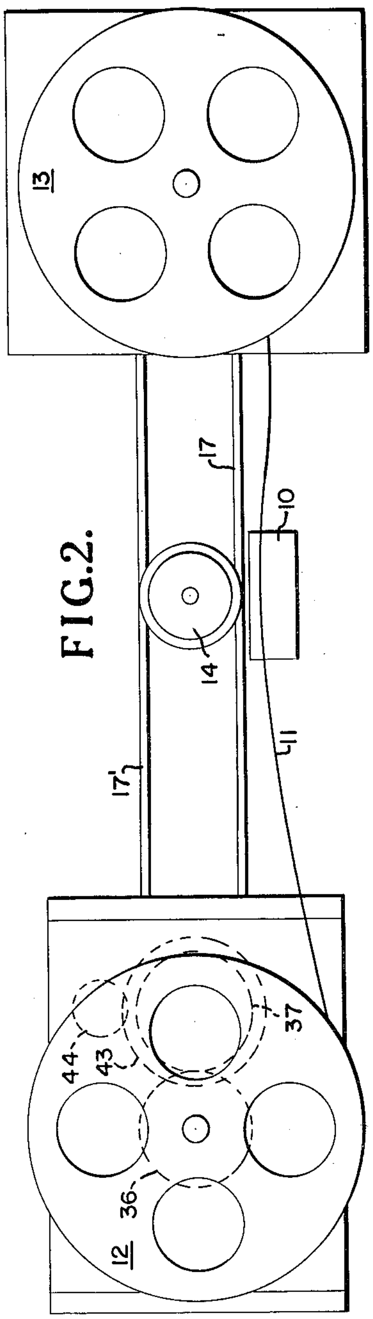

Referring to the drawings wherein like numerals represent corresponding parts throughout the several views;

FIG. 1 is a side elevational view showing portions of the subject invention in cross section; and FIG. 2 is a top plan view of a preferred arrangement of the elements shown in FIG. 1.

Referring first to FIG. 1, numeral 10 designates the capstan unit and read out mechanism through which tape 11 passes as it is unwound from storage reel 12 and simultaneously rewound on take-up reel 13. It is to be understood that capstan unit 10 functions in the conventional manner of pulling tape 11 from reel 12 and reading out the information contained thereon through suitable electromagnetic or mechanical means, not illustrated. As further shown in FIG. 1, motor 14 is provided with an output shaft 15 to which pulley 16 is secured for rotation therewith. Motor 14 therefore functions to provide the rotation of take-up reel 13 through belt 17, pulley 18 and slip clutch 19 which is secured to take-up shaft 20, the latter of which is suitably journalled in housing 21 by means of bearings 22, 22′.

Although it is to be understood that any conventional type of slip clutch may be utilized in the subject invention, one particular type thereof is described in detail for purposes of illustration. Still referring to FIG. 1, numeral 23 designates a flange rigidly secured to or integral with take-up shaft 20 and numeral 24 indicates a clutch disc which frictionally engages the side of pulley 18. Pulley 18 is journalled on shaft 20 so as to be freely rotatable relative thereto, whereas, clutch disc 24 has an internally splined collar 27 which engages a complementary splined portion on shaft 20. Clutch disc 24 is therefore prevented from rotation relative to shaft 20 but is capable of limited axial movement thereon relative to pulley 18. In addition, disc 24 or the side of pulley 18 or both may be provided with a suitable high friction surface coating thereby increasing the frictional contact between disc 24 and pulley 18. The degree of frictional engagement between disc 24 and pulley 18 is maintained constant by the interposition of spring 28 between flange 23 and disc 24. In this manner, a constant torque is applied to shaft 20 through slip clutch 19, and hence, take-up reel 13 so that the tension of that portion of tape 11 which is located between capstan unit 10 and take-up reel 13 is also maintained constant. That is, the biasing force exerted by spring 28 on clutch disc 24 is just sufficient to rotate take-up reel 13 if the capstan unit 10 is driving the tape, or, to maintain constant tension on the tape through slippage of the clutch if the capstan unit is not driving the tape.

Referring now to unit B shown to the left of capstan unit 10 and motor 14 in FIG. 1, it will be apparent that motor pulley 16 also provides continuous drive to shaft 30 by means of belt 17′ and shaft pulley 31, however, this drive is not transferred to reel shaft 32 due to the interposition of one way clutch 33. Thus, when capstan unit 10 is actuated, tape 11 is pulled from reel 12 thereby rotating reel shaft 32 which rotates independently of shaft 30 and supplies a driving torque to shaft 35 through gears 36 and 37 which are secured for rotation with shafts 32 and 35 respectively, the shafts being journalled for rotation in housing 38 by means of bearings 39, 39′ and 40, 40′. Therefore, in order to provide a braking torque on reel 12 so as to maintain a constant tension on that portion of the tape which is between reel 12 and capstan unit 10, shaft 35 is connected to a second one way clutch 41 which in turn transmits the drive from shaft 35 to gear shaft 42 containing brake gear 43 secured for rotation therewith. In turn, brake gear 43 is in engagement with slip clutch gear 44 secured to brake shaft 45 journalled in suitable bearings 46 and containing a second driving clutch disc 47 having a splined collar portion 48 for transmitting torque while allowing relative sliding motion between disc 47 and shaft 45. Since disc 47 is biased into frictional engagement with brake disc 49 by means of spring 50, a braking effect is therefore applied to reel 12 through disc 47, shaft 45, gear 44, gear 43, shaft 42, one way clutch 41, shaft 35, gear 37, gear 36, and shaft 32. Of course, it is to be understood that one way clutch 41 is operative to transmit drive from shaft 35 to shaft 42 when reel 12 is unwinding tape 11 but is not operative to transmit drive between shafts 35 and 42 when reel 12 is rotating in the opposite direction to rewind tape 11 thereon. Conversely, one way clutch 33 is so arranged as to transmit drive from shaft 30 to reel shaft 32 when motor 14 is reversed in order to rewind tape 11 back onto reel 12. Thus, it will be seen that when motor 14 is operating in the reverse direction, drive is transmitted through belt 17′, pulley 31, shaft 30, one way pulley 33, and shaft 32, however, no drive is transmitted to slip discs 47, 49 due to the presence of one way clutch 41. It will also be apparent that when motor 14 is operated in the reverse direction, drive is transmitted to reel 13 through slip clutch 19 and shaft 20 so that the tension of tape 11 is also maintained constant throughout the rewinding thereof onto reel 12.

Thus, the subject invention provides an extremely simple arrangement whereby the tension on all portions of tape 11 is maintained constant regardless of whether the tape is being unwound from supply reel 12, rewound onto supply reel 12 or, is momentarily brought to rest due to the deenergization of capstan unit 10. It should further be noted that the disclosed arrangement does not require any alternatively engaging clutches so that there is no sudden load or increased tension placed on tape 11 at any time, but rather, both the forward movement and the reverse movement of tape 11 is accomplished smoothly and without any sudden increase or decrease in tension on the tape itself or upon any of the shafts and associated gearing.

Referring now to FIG. 2, there is shown a slightly modified and preferred arrangement of the shafts within unit B which differs from that shown schematically in FIG. 1 merely in that shafts 32, 35 and 45 are not arranged in a single plane as shown in FIG. 1, but rather, are arranged in a triangular relationship whereby a considerable saving in space is achieved. In all other respects the structure and operation of the FIG. 2 embodiment is identical to that shown and described in detail with regard to FIG. 1, and hence, a repetition of the description thereof is not believed to be necessary or desirable.

Of course, it is to be understood that the foregoing description and accompanying figures of drawing are intended to be illustrative of the invention which is not to be limited to the particular embodiments illustrated since numerous alterations and/or modifications will be readily apparent to those skilled in the art.

Having thus described the invention what is desired to be secured by Letters Patent is:

1. Apparatus for maintaining constant tension on a tape mounted between and secured to first and second spaced reels comprising first and second rotatable shafts on which the first and second reels are respectively mounted, first drive means engaging the tape for the transfer thereof from one of said reels to the other, a drive transmitting means rotatably mounted on said second shaft, second drive means connected to said drive transmitting means for the rotation thereof, a slip clutch for transferring a constant torque from said transmitting means to said second shaft, a third rotatable shaft in axial relationship to said first shaft and operatively connected to said second drive means, a one-way clutch for transferring torque from said third shaft to said first shaft when said first shaft is rotating in a direction to wind tape onto the first reel, a fourth rotatable shaft located adjacent to said first shaft and connected thereto for rotation therewith, a fifth rotatable shaft in axial relationship to said fourth shaft, a one-way clutch for transferring torque from said fourth shaft to said fifth shaft when said first shaft is rotating in a direction to remove tape from said first reel, and means connected to said fifth shaft for maintaining braking torque on said first shaft when said first shaft is rotating in a direction to remove tape from said first reel.

2. The apparatus of claim 1 wherein said first drive means comprises a capstan unit and said second drive means comprises a reversible motor.

3. The apparatus of claim 1 wherein said first shaft and said fourth shaft each have a gear rigidly mounted thereon, said gears being in mutual engagement, whereby rotation of said first shaft will result in rotation of said fourth shaft.

4. The apparatus of claim 1 wherein said fifth shaft has a gear rigidly mounted thereon, and said braking means comprises a slip-type brake having a gear member in engagement with said fifth shaft gear.

References Cited in the file of this patent

UNITED STATES PATENTS

| | | |
|---|---|---|
| 2,217,183 | Ross | Oct. 8, 1940 |
| 2,659,541 | Camras | Nov. 17, 1953 |
| 2,705,599 | McCollough | Apr. 5, 1955 |
| 2,718,361 | Evraets | Sept. 20, 1955 |

FOREIGN PATENTS

| | | |
|---|---|---|
| 614,943 | Canada | Feb. 21, 1961 |